(12) United States Patent
Shimai et al.

(10) Patent No.: US 10,572,792 B2
(45) Date of Patent: Feb. 25, 2020

(54) IC TAG CONTAINER AND IC TAG-ATTACHED RUBBER PRODUCT PROVIDED WITH THE SAME

(71) Applicant: NITTA CORPORATION, Osaka-shi, Osaka (JP)

(72) Inventors: Toshiharu Shimai, Yamatokooriyama (JP); Yoshiharu Kiyohara, Yamatokooriyama (JP)

(73) Assignee: NITTA CORPORATION, Osaka-Shi (JP)

( * ) Notice: Subject to any disclaimer, the term of this patent is extended or adjusted under 35 U.S.C. 154(b) by 11 days.

(21) Appl. No.: 15/754,955

(22) PCT Filed: Sep. 4, 2015

(86) PCT No.: PCT/JP2015/075273
§ 371 (c)(1),
(2) Date: Feb. 23, 2018

(87) PCT Pub. No.: WO2017/033344
PCT Pub. Date: Mar. 2, 2017

(65) Prior Publication Data
US 2019/0197382 A1    Jun. 27, 2019

(30) Foreign Application Priority Data
Aug. 26, 2015   (JP) .................. 2015-167287

(51) Int. Cl.
*G06K 19/06* (2006.01)
*G06K 19/077* (2006.01)

(52) U.S. Cl.
CPC ..... *G06K 19/07728* (2013.01); *G06K 19/077* (2013.01); *G06K 19/07745* (2013.01); *G06K 19/07749* (2013.01)

(58) Field of Classification Search
CPC ....... G06K 19/07728; G06K 19/07745; G06K 19/07749
(Continued)

(56) References Cited

U.S. PATENT DOCUMENTS 7,719,425 B2 * 5/2010 Colby .................. G06K 19/025
235/375
2006/0164250 A1   7/2006 Kawai
(Continued)

FOREIGN PATENT DOCUMENTS

EP   1887493 A2   2/2008
EP   2654000 A1   10/2013
(Continued)

OTHER PUBLICATIONS

Extended European Search Report, dated Mar. 1, 2019, for European Application No. 15902313.4.
(Continued)

*Primary Examiner* — Karl D Frech
(74) *Attorney, Agent, or Firm* — Birch, Stewart, Kolasch & Birch, LLP

(57) ABSTRACT

The present invention provides an IC tag container to be attached to an attachment target member, the IC tag container including an IC tag that includes an IC chip and an antenna configured to electrically transmit and receive information stored in the IC chip, at least one reinforcing member that is disposed on at least one surface of the IC tag and that covers the IC chip, at least one sheet-like cover member that is disposed on the at least one surface side of the IC tag and that covers at least the antenna and the reinforcing member, and an enclosing member that is disposed on the at least one surface side of the IC tag, that covers the IC tag, the reinforcing member, and the cover member, and that is attachable to the attachment target member, wherein the (Continued)

cover member is configured to be slidable along at least a portion of the IC tag, and the cover member is not adhesively joined to the IC tag around the reinforcing member.

8 Claims, 6 Drawing Sheets

(58) Field of Classification Search
USPC .................................................. 235/492, 487
See application file for complete search history.

(56) References Cited

U.S. PATENT DOCUMENTS

| | | |
|---|---|---|
| 2006/0174985 A1 | 8/2006 | Shimura |
| 2008/0042851 A1 | 2/2008 | Baba et al. |
| 2010/0097191 A1 | 4/2010 | Yamagajo et al. |
| 2013/0277433 A1 | 10/2013 | Baba et al. |
| 2014/0103117 A1 | 4/2014 | Takeuchi et al. |
| 2015/0254548 A1* | 9/2015 | Ikemoto ................. H01Q 5/35 235/492 |
| 2015/0294211 A1 | 10/2015 | Nakano et al. |

FOREIGN PATENT DOCUMENTS

| | | |
|---|---|---|
| JP | 2004-90775 A | 3/2004 |
| JP | 2005-96423 A | 4/2005 |
| JP | 2010-279029 A | 12/2010 |
| JP | 2013-164644 A | 8/2013 |
| JP | 2014-81828 A | 5/2014 |
| WO | WO 2009/011041 A1 | 1/2009 |

OTHER PUBLICATIONS

International Search Report, issued in PCT/JP2015/075273, PCT/ISA/210, dated Oct. 6, 2015.
Written Opinion of the International Searching Authority, issued in PCT/JP2015/075273, PCT/ISA/237, dated Oct. 6, 2015.

* cited by examiner (a)

(b)

IC TAG CONTAINER AND IC TAG-ATTACHED RUBBER PRODUCT PROVIDED WITH THE SAME

TECHNICAL FIELD

The present invention relates to an IC tag container and an IC tag-attached rubber product provided with the same.

BACKGROUND ART

Recently, a type of IC tag called "inlet" having a configuration in which an antenna pattern for radio frequency communication and an IC chip are mounted on a base sheet made of plastic or paper has been proposed. Such inlets are sealed with resin and then attached to or embedded in articles, whereby the inlets are used for management of the articles. A problem with such inlets is that if an inlet is bent, since the IC chip is hard to bend compared with the antenna pattern, which is easy to bend, bending stress may be applied to the IC chip, and the IC chip may thus be broken or detached from the antenna pattern.

To address this problem, Patent Literature 1 proposes an IC tag in which, in order to reduce bending stress that may be applied to the IC chip, a hard reinforcing member that is larger than the IC chip is disposed on the IC chip.

CITATION LIST

Patent Literature

Patent Literature 1: WO 2009/011041

SUMMARY OF INVENTION

Technical Problem

Incidentally, IC tags such as that described above are employed for a variety of uses, and may be used attached to various products; for example, an IC tag is covered with an enclosing member and then fixed to a product. To fix an IC tag to a product, the IC tag may be fixed after pressure is applied thereto. In this case, for an IC tag such as that disclosed in Patent Literature 1, the problem of possible breakage or detachment of the IC chip due to bending can be solved; however, there is a risk that, when the antenna is bent, stress may be concentrated in an edge portion of the reinforcing member, thereby causing a break in the antenna.

The present invention was made to address the above-described problem, and it is an object thereof to provide an IC tag container for an IC tag in which an IC chip is protected with a reinforcing member, the IC tag container being capable of preventing damage to the IC tag, such as a break in an antenna, even when subjected to bending, and an IC tag-attached rubber product provided with the IC tag container.

Solution to Problem

The present invention provides an IC tag container to be attached to an attachment target member, the IC tag container including an IC tag that includes an IC chip and an antenna configured to electrically transmit and receive information stored in the IC chip, at least one reinforcing member that is disposed on at least one surface of the IC tag and that covers the IC chip, at least one sheet-like cover member that is disposed on the at least one surface side of the IC tag and that covers at least the antenna and the reinforcing member, and an enclosing member that is disposed on the at least one surface side of the IC tag, that covers the IC tag, the reinforcing member, and the cover member, and that is attachable to the attachment target member, wherein the cover member is configured to be slidable along at least a portion of the IC tag, and the cover member is not adhesively joined to the IC tag around the reinforcing member.

The above-described IC tag container can be configured such that the IC tag container includes two of the reinforcing members and two of the cover members, wherein both surfaces of the IC chip are covered with the respective reinforcing members, and the reinforcing members are covered with the respective cover members.

In the above-described IC tag containers, it is possible that the cover member is formed of a resin material.

In the above-described IC tag containers, it is possible that the enclosing member is formed into a bag-like shape that contains the IC tag, the reinforcing member, and the cover member.

In the above-described IC tag containers, it is possible that the enclosing member is formed of a fabric impregnated with rubber.

In the above-described IC tag containers, it is possible that the rubber is unvulcanized.

An IC tag-attached rubber product according to the present invention includes any of the above-described IC tag containers and an attachment target member that is at least partially formed of a rubber material and that is adhesively joined to the enclosing member of the IC tag container.

In the above-described IC tag-attached rubber product, it is possible that the enclosing member of the IC tag container is formed into a sheet-like shape, the IC tag, the reinforcing member, and the cover member are disposed between the enclosing member and the attachment target member, and a peripheral edge of the enclosing member is adhesively joined to the rubber material of the attachment target member.

Advantageous Effects of Invention

According to the present invention, in an IC tag in which an IC chip is protected with a reinforcing member, damage to the IC tag, such as a break in an antenna, can be prevented even when subjected to bending.

DESCRIPTION OF EMBODIMENTS

Figure 1:
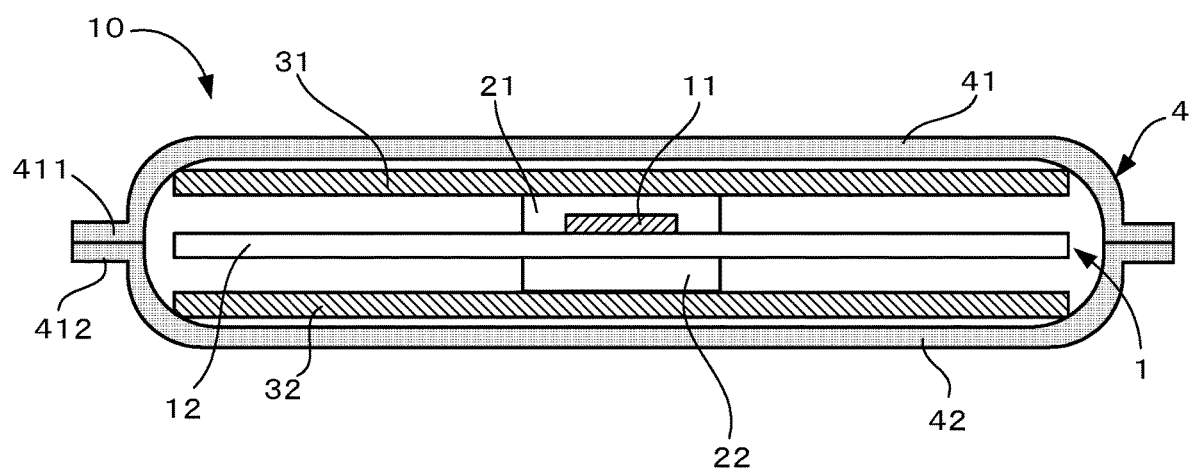
FIG. 1 is a cross-sectional view illustrating an embodiment of an IC tag container according to the present invention.

Hereinafter, an embodiment of an IC tag container according to the present invention will be described with reference to the drawings. FIG. 1 is a cross-sectional view of an IC tag container according to the present embodiment. As shown in this drawing, an IC tag container 10 according to the present embodiment includes an IC tag 1 that has an IC chip 11 and an antenna 12, a pair of reinforcing members 21 and 22 that are attached so as to cover the IC chip 11 of the IC tag 1, sheet-like cover members 31 and 32 that are disposed so as to cover the IC tag 1 and the pair of reinforcing members 21 and 22, and an enclosing member 4 that contains the IC tag 1, the reinforcing members 21 and 22, and the cover members 31 and 32. The thus configured IC tag container 10 is to be fixed to a rubber product 5 as will be described later. Hereinafter, first, the various members of the IC tag container 10 will be described, and then, attachment of the IC tag container 10 to the rubber product 5 will be described. It should be noted that the terms "upper" and "lower" as used in the following description relative to directions in the drawings are used for convenience of description only and not to be construed as limiting the orientation of the various members of the present invention.

1. IC Tag

Figure 2:
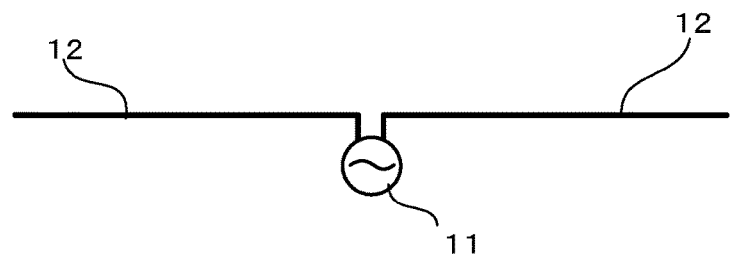
FIG. 2 is a plan view illustrating a schematic configuration of an IC tag in FIG. 1.

FIG. 2 is a plan view illustrating a schematic configuration of the IC tag 1. As shown in FIG. 2, the IC tag 1 according to the present embodiment includes a known IC chip 11 having a memory function and the antenna 12 formed of a conductor, and the IC chip 11 and the antenna 12 are electrically connected to each other. A known antenna can be used as the antenna 12. For example, the antenna 12 can be configured by a dipole antenna. In this case, an impedance matching portion for matching the impedance between the IC chip 11 and the dipole antenna 12 can be provided if necessary. When such a dipole antenna is adopted as the antenna 12, the IC tag 1 can be formed into an elongated shape extending in a single direction.

Figure 3:
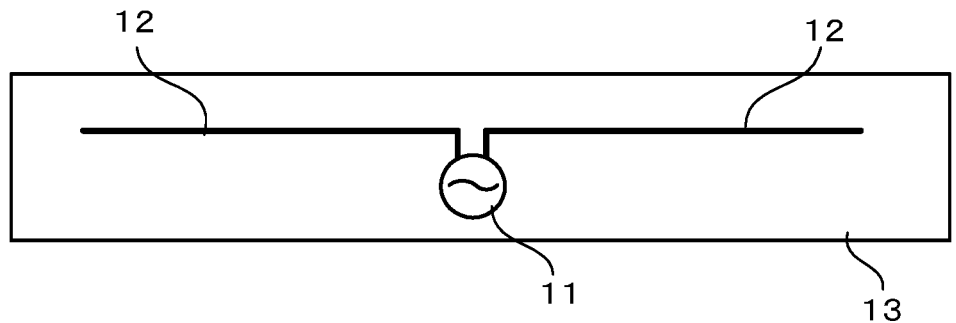
FIG. 3 is a plan view illustrating another example of the IC tag in FIG. 1.

Moreover, the IC tag 1 according to the present embodiment not only may be constituted exclusively by the IC chip 11 and the antenna 12, but may also be provided in the form of the so-called inlet in which it is attached to a sheet-like base material. That is to say, as shown in FIG. 3, after the antenna 12 is formed on one surface of a sheet-like base material 13 through etching, screen printing, or the like, the IC chip 11 can be attached onto the antenna 12 through bonding or the like. It should be noted that, for example, a form in which the IC chip 11 and the antenna 12 are sandwiched between a pair of sheet-like base materials 13 may also be adopted as the inlet.

Figure 4:
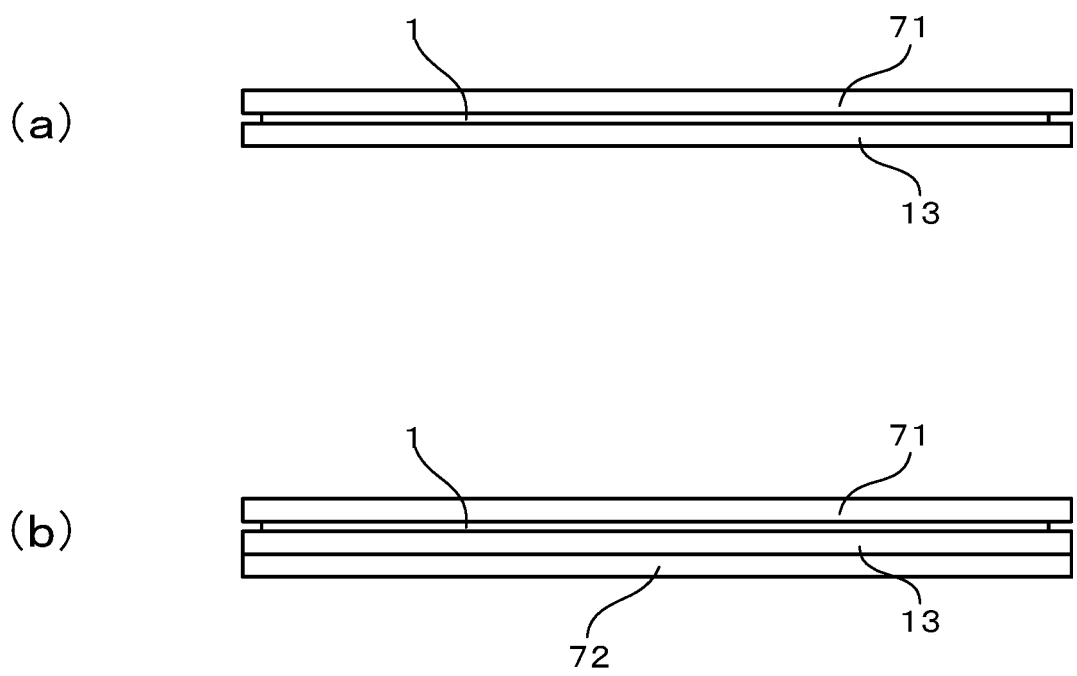
FIG. 4 shows cross-sectional views illustrating an example in which a protective sheet is applied to the IC tag in FIG. 1.

Moreover, a protective sheet for protecting the IC tag 1 can be attached to both surfaces of the thus formed IC tag 1. For example, as shown in FIG. 4(a), a protective sheet 71 can be attached, with a pressure-sensitive adhesive or the like, to a surface of the inlet 1 on which the antenna 12 and the IC chip 11 are exposed, or as shown in FIG. 4(b), the inlet 1 can be sandwiched between a pair of protective sheets 71 and 72 via a pressure-sensitive adhesive. It should be noted that the protective sheets 71 and 72 can be formed of various materials and, for example, may be formed of a sheet-like material made of polyethylene, polypropylene, polyethylene terephthalate, or the like. Moreover, the IC tag 1 without a base material may also be provided with a protective sheet.

The above-described IC tag 1 transmits and receives information stored in the IC chip 11 using radio waves in the UHF band, for example. It should be noted that the size of the IC tag 1 can be set as appropriate in accordance with the uses, such as a rubber product, which will be described later, and are not limited.

2. Reinforcing Member

Figure 5:
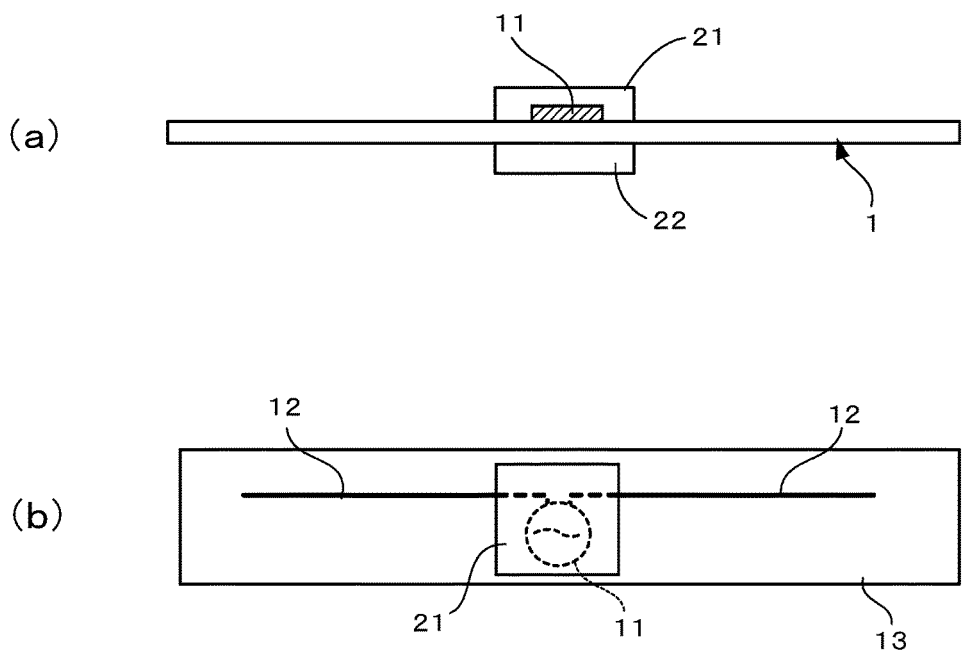
FIG. 5 shows a cross-sectional view (a) and a plan view (b) illustrating a state in which a reinforcing member is attached to the IC tag in FIG. 1.

Next, the reinforcing members 21 and 22 will be described. As shown in FIG. 5, the sheet-like reinforcing members 21 and 22 are fixed to upper and lower surfaces, respectively, of the IC tag 1 so as to cover the IC chip 11. The reinforcing members 21 and 22 are used to protect the IC chip 11 and each formed into a rectangular shape that has a larger area than the IC chip 11. Moreover, the reinforcing members 21 and 22 are formed of a material that is hard or thick enough to prevent the IC chip 11 from bending even when, for example, the antenna 12 of the IC tag 1 is bent. Examples of such material include a hard sheet formed of polyethylene (PE) or a resin that is harder than PE. Examples of the resin that is harder than polyethylene include polyethylene terephthalate (PET), nylon, polycarbonate, an ABS resin, an AES resin, an epoxy resin, and polypropylene (PP). Moreover, the thickness may be set at 100 to 1000 μm, for example. It should be noted that, since it is sufficient that the reinforcing members 21 and 22 have a larger area than the IC chip 11, the reinforcing members 21 and 22 may also have a shape other than a rectangular shape.

It should be noted that, although the reinforcing members 21 and 22 of the example in FIG. 5 are disposed on both surfaces of the IC tag 1, a configuration may also be adopted in which a reinforcing member is disposed on only one surface, in particular, only a side on which the IC chip 11 is exposed. Moreover, although the position of a reinforcing member may be changed as appropriate in accordance with the configuration of the IC tag 1, if a protective sheet described above is provided, a reinforcing member can be disposed on that protective sheet. If no protective sheet is provided, a reinforcing member may be disposed directly on the IC chip 11. Furthermore, a reinforcing member can also be disposed on the base material of the inlet.

3. Cover Member

Next, the cover members 31 and 32 will be described. As shown in FIG. 1, the cover members 31 and 32 are sheet-like members for covering the IC tag 1 with the reinforcing members 21 and 22 that are formed as describe above, and are formed into substantially the same rectangular shape as the IC tag 1. The cover members 31 and 32 protect the IC tag 1 against external force, and can each be disposed such that at least a portion thereof can slide on the IC tag 1. Thus, for example, when external force such as bending is applied, the cover members 31 and 32 slide on the IC tag 1 and thus can disperse the force acting on the IC tag 1. Therefore, the cover members 31 and 32 may also be simply placed on the IC tag 1 or the respective reinforcing members 21 and 22 rather than being adhesively joined thereto. However, for the purpose of positioning during production, the cover members 31 and 32 can only partially be adhesively joined to the IC tag 1 or the respective reinforcing members 21 and 22 with an adhesive. However, as will be described later, in order to protect the IC tag 1 against the load of the reinforcing members 21 and 22 when external force is applied thereto, the cover members 31 and 32 should not be adhesively joined to the IC tag 1 at least around the reinforcing members 21 and 22. Although this area is not limited, for example, it is preferable that the IC tag 1 is not adhesively joined to the cover members 31 and 32 within an area extending 0.1 mm or more and more preferably 0.4 mm or more from outer peripheral edges of the reinforcing members 21 and 22.

It should be noted that although the cover members 31 and 32 of the above-described example are disposed on both the upper surface side and the lower surface side of the IC tag 1, it is sufficient that a cover member is disposed at least on the side on which the reinforcing members 21 and 22 are disposed. Therefore, if only a single reinforcing member is disposed, only a single cover member may be disposed as well. Moreover, the size and shape of the cover members 31 and 32 are not limited, and it is sufficient that the cover members 31 and 32 have such size and shape that are enough to cover at least the reinforcing members 21 and 22. Furthermore, the material that composes the cover members 31 and 32 is not limited, and the cover members 31 and 32 can be formed of a resin material similar to that of the base material 13, 14 and the reinforcing members 21 and 22, paper, or the like.

4. Enclosing Member

Subsequently, the enclosing member 4 will be described. As shown in FIG. 1, the enclosing member 4 is used to contain the above-described IC tag 1, reinforcing members 21 and 22, and cover members 31 and 32, and is formed so as to have an internal space. Therefore, for example, a bag-like member obtained by fixing peripheral edges of a pair of sheet-like enclosing materials 41 and 42 to each other can be used as the enclosing member 4. In this case, peripheral edges 411 and 412 of the enclosing materials 41 and 42 can be fixed to each other using various methods, and, for example, can be fixed by an adhesive or by welding using a high frequency welder, heat sealing, or the like.

The enclosing member 4 can be formed of various materials such as a woven fabric, a resin material, and the like. For example, the enclosing member 4 can be formed of a fabric impregnated with rubber. The use of a fabric as the enclosing member 4 prevents generation of air bubbles because, as will be described later, air escapes from gaps between threads, such as interstices or stitches, during integration with the rubber product 5. Furthermore, even if heat and pressure are applied to the fabric during integration, the fabric, unlike a rubber sheet, for example, does not soften and flow. Therefore, the shape (thickness) of the fabric remains substantially unchanged, and the dimensions thereof are unlikely to vary even if the integration is performed under different temperature or pressure conditions. Thus, the fabric can be easily processed as designed. Moreover, if a fabric that lacks stretchability is used, the bending resistance of the IC tag container 10 and the processability during forming with the rubber product, which will be described later, become poor. For this reason, a fabric that has stretchability is preferable.

The fabric that has stretchability may be a woven fabric or may be a knitted fabric. In the case where the fabric is a woven fabric, it is sufficient that at least one of the warp and the weft is composed of threads that have stretchability. Examples of such threads that have stretchability include heat-shrunken threads (e.g., woolly threads and the like), spandex, and twisted threads. In the case where the fabric is a knitted fabric, stretchability can be imparted depending on the knitting pattern. Therefore, there is no limitation on the threads that constitute the knitted fabric, and threads that have stretchability such as those described above may also be used.

The thickness of the fabric is not limited, and, for example, a fabric having an areal weight of preferably about 80 to 500 g/m$^2$ in terms of the areal weight of the raw fabric may be used. For example, durability including the bending resistance and the like can be improved even more by using a thick fabric such as sailcloth.

Rubber with which such a fabric is impregnated (i.e., rubber contained in the enclosing material 2) is not limited, and examples thereof include nitrile rubber, chloroprene rubber, chlorosulfonated polyethylene, polybutadiene rubber, natural rubber, ethylene propylene rubber (EPM), ethylene propylene diene rubber (EPDM), hydrogenated nitrile rubber (H-NBR), millable urethane, acrylic rubber, silicone rubber, fluororubber, and carboxylated nitrile rubber. These rubbers may be used alone or in combination of two or more. It is preferable that the rubber contained in the enclosing member 4 is an unvulcanized rubber.

The amount of rubber that is contained in the enclosing member 4 is not limited, as long as it is an amount that enables adhesive joining to the rubber product 5, which will be described later. It is preferable that the fabric is impregnated with the rubber at a rate of about 50 to 300 g per 1 m$^2$ of the fabric, although the rate depends on the type and thickness of the fabric. Moreover, in the case where the enclosing member 4 is formed by the pair of enclosing materials 41 and 42, the enclosing materials 41 and 42 may be formed of the same material or may be formed of different materials.

5. Attachment to Rubber Product

Examples of the rubber product (attachment target member) 5 with which the above-described IC tag container 10 is to be integrated include those that are at least partially formed of a rubber material, such as sheet-like products, such as mats and belts, tires, timing belts, base-isolating materials, joints, tubes, and hoses. Examples of the rubber include the above-described rubbers, and these rubbers may be used alone or in combination of two or more.

It is preferable that the rubber that forms the rubber product 5 is an unvulcanized rubber. Preferably, the rubber that forms the rubber product 5 is the same type of rubber as the rubber contained in the enclosing member 4, and more preferably, both of these rubbers are unvulcanized rubbers. When the same type of rubbers is used, the rubber product 5, the IC tag 1, and the enclosing member 4 can be more easily adhesively joined together. When both of the rubbers are unvulcanized rubbers, the rubbers are vulcanized during integral forming, so that the rubber contained in the enclosing member 4 and the rubber product 5 can be adhesively joined with higher adhesion. As a result, water is unlikely to reach the IC tag 1, and thus an IC tag-attached rubber product with excellent water resistance can be obtained.

Various additives such as a processing aid, a plasticizer, a coloring agent, an ultraviolet absorber, and an anti-aging agent, for example, may also be added to the rubber, as long as the effects of the present invention are not impaired.

Figure 6:
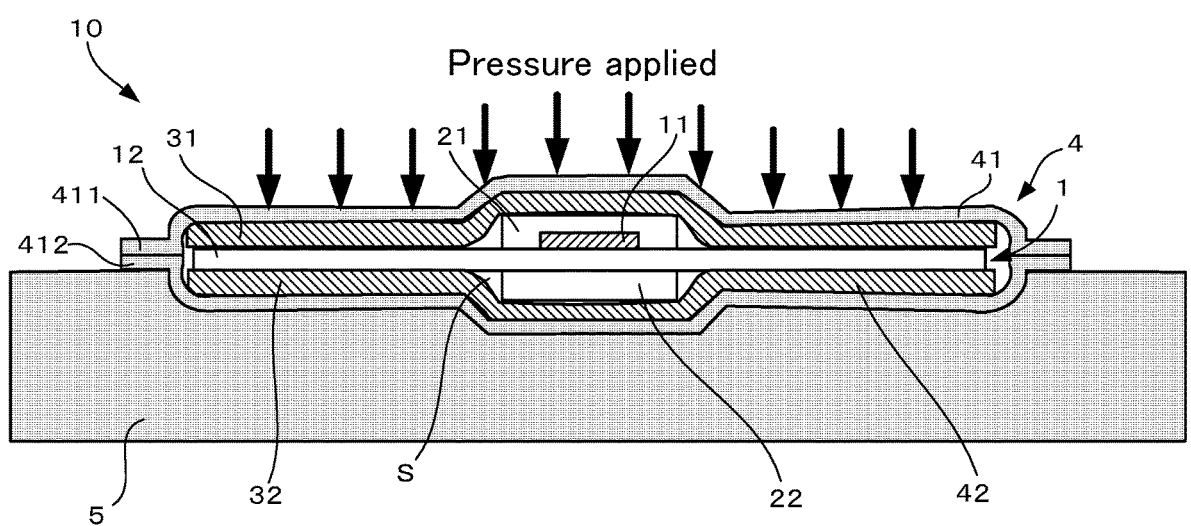
FIG. 6 is a cross-sectional view illustrating a mode in which the IC tag container in FIG. 1 is attached to a rubber product.

Next, a method for attaching the IC tag 1 to the rubber product 5 will be described. First, the IC tag container 10 shown in FIG. 1 is prepared, and is disposed on a surface of the rubber product 5. Then, as shown in FIG. 6, integral forming processing (e.g., press forming) is performed under predetermined heating and pressure-applying conditions to adhesively join the rubber product 5 and the rubber contained in the enclosing member 4 to each other. For example, if the rubber product 5 or the rubber contained in the enclosing member 4 is unvulcanized, it is vulcanized during this forming processing, and thus the rubber product 5 and the rubber contained in the enclosing member 4 are adhesively joined to each other with high adhesion. It should be noted that, even when the rubber product 5 is a vulcanized product, they are adhesively joined to each other with high adhesion. The reason for this is that, since the enclosing member 4 is composed of a fabric, a large number of minute protrusions and depressions are present therein, thereby exhibiting a high anchoring effect during adhesive joining. Moreover, as a result of press forming, the cover members 31 and 32 deform along the IC tag 1 and the reinforcing members 21 and 22. At this time, since the cover members 31 and 32 are not adhesively joined to the IC tag 1 at least around the reinforcing members 21 and 22, a space S is formed between the IC tag 1 and each of the cover members 31 and 32 around the reinforcing members 21 and 22. In this manner, the rubber product 5 and the IC tag container 10 are integrated.

The heating and pressure-applying conditions are not limited. For example, heating is performed at about 150 to 220° C., and preferably, heating is performed at a temperature that is required for an ordinary vulcanization process. The processing time is preferably about 3 to 30 minutes. Furthermore, during the processing, preferably, a pressure of about 0.2 to 5 MPa is applied. If high adhesion is required, it is preferable to apply a pressure of 0.5 MPa or more. Also, if adhesive joining to a vulcanized rubber is performed as well, it is preferable to perform the processing under high-pressure conditions, and thus, it is preferable to apply a pressure of 0.5 MPa or more.

Figure 7:
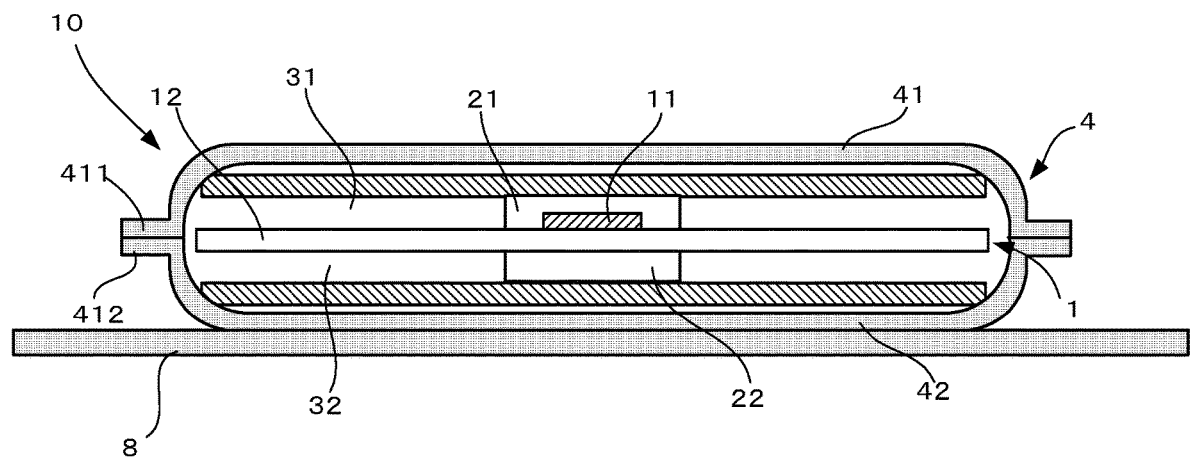
FIG. 7 is a cross-sectional view illustrating a mode in which the IC tag container in FIG. 1 is attached to a rubber product.

In the foregoing example, the IC tag container 10 is directly attached to the rubber product. However, the following method can also be adopted. First, as shown in FIG. 7, the IC tag container 10 is disposed on a rubber sheet 8, and then, the same integral forming processing as that described above is performed. The rubber sheet 8 is formed of the same material as the above-described rubber product. The IC tag container 10 and the rubber sheet 8 that have thus been integrally formed are attached to the rubber product 5. At this time, the rubber sheet 8 can be fixed to the rubber product 5 with an adhesive.

Figure 8:
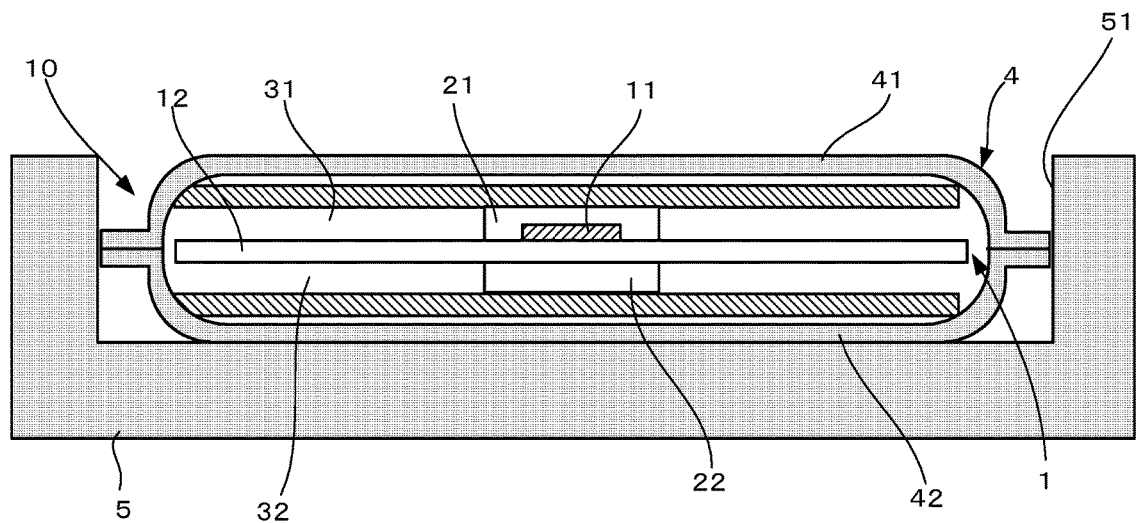
FIG. 8 is a cross-sectional view illustrating a mode in which the IC tag container in FIG. 1 is attached to a rubber product.

Alternatively, as shown in FIG. 8, a method can also be adopted in which a recess 51 is formed in the rubber product 5, the IC tag container 10 is disposed in this recess 51, and then the above-described integral forming processing is performed. It should be noted that FIGS. 7 and 8 illustrate a state prior to integral forming.

6. Features

In the IC tag container 10 according to the present embodiment, the cover members 31 and 32 cover the respective reinforcing members 21 and 22, but the cover members 31 and 32 are not adhesively joined to the IC tag 1 at least around the reinforcing members 21 and 22. Therefore, as shown in FIG. 6, for example, when pressure is applied during integral forming with the rubber product 5, the spaces S (air layers) can be formed between the IC tag 1 and the cover members 31 and 32 around the reinforcing members 21 and 22. Thus, the following effects can be obtained.

Figure 9:
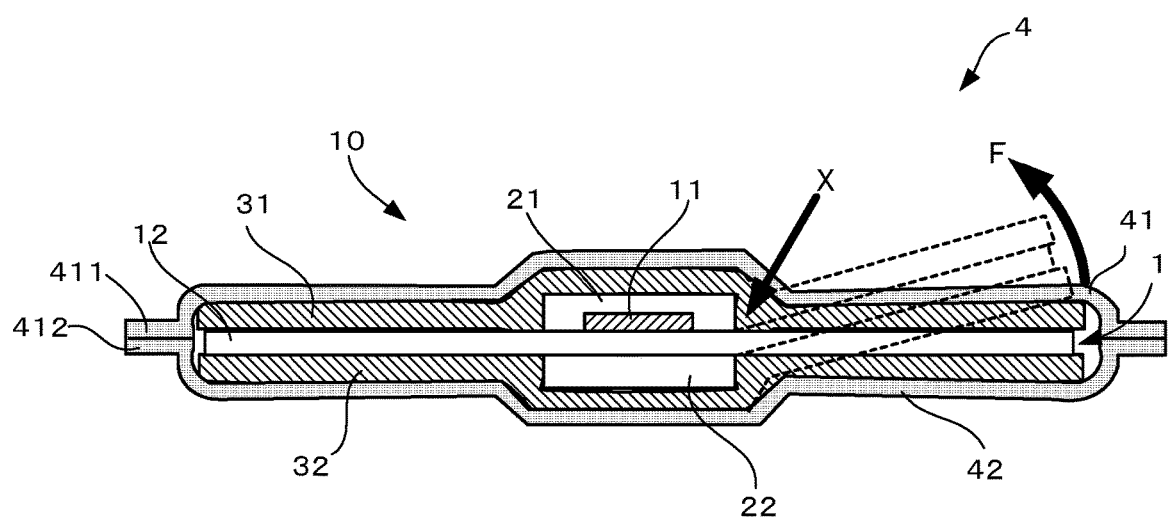
FIG. 9 shows cross-sectional views for explaining how damage to an IC tag occurs.
Figure 9:
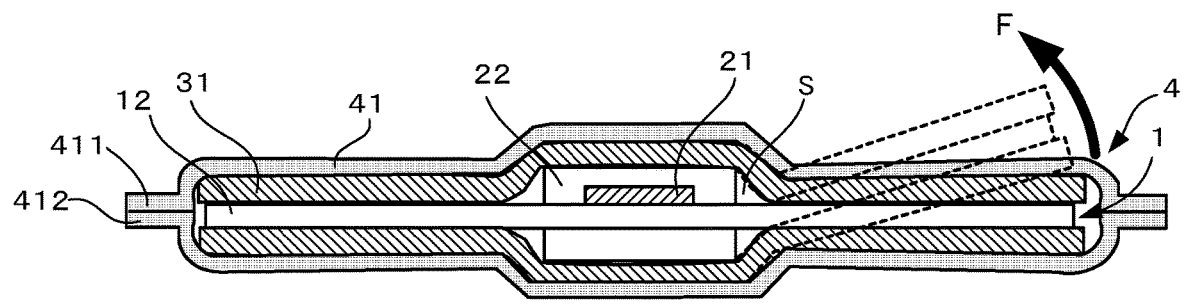

For example, if the cover members 31 and 32 are adhesively joined to the IC tag 1 around the reinforcing members 21 and 22, as illustrated in FIG. 9(*a*), the cover members 31 and 32 are in intimate contact with the IC tag around the reinforcing members 21 and 22 (portions indicated by the arrow in FIG. 9). For this reason, if force F acts on the IC tag container 10 and causes bending, there is a risk that the IC tag 1 may be bent at outer edge portions X of the reinforcing members 21 and 22 and thus may suffer damage such as a break in the antenna 12.

In contrast, in the IC tag container according to the present embodiment, as illustrated in FIG. 9(*b*), the spaces S, that is, the air layers are formed at the outer edge portions of the reinforcing members 21 and 22, and therefore, even if force F causes bending, the air layers alleviate concentration of stress in the outer edge portions of the reinforcing members 21 and 22. Consequently, a break in the antenna can be prevented. In particular, if hard cover members 31 and 32 are used, the cover members 31 and 32 are unlikely to deform along the shape of the respective reinforcing members 21 and 22 during forming, and accordingly, the air layers S are easily created. Thus, a break in the antenna can be reliably prevented. Moreover, the air layers can also alleviate concentration of pressure during integral forming, so that a break in the antenna can also be prevented during forming.

7. Modifications

Although one embodiment of the present invention has been described above, the present invention is not limited to the foregoing embodiment, and various changes can be made thereto without departing from the gist of the invention. Moreover, a plurality of modifications described below can be combined as appropriate.

7-1

In the foregoing embodiment, the IC tag container 10 is attached to the rubber product 5. However, the present invention is not limited to this. That is to say, the IC tag container 10 can also be attached to products other than a rubber product using various methods, such as an adhesive, a double-sided adhesive tape, welding, and sewing. In particular, if the IC tag container 10 is attached to a product to which pressure may be applied during attachment or during use, the above-described effects can be particularly advantageously obtained.

7-2

In the foregoing embodiment, the protective sheets 71 and 72 are used. However, the protective sheets are not indispensable, and the IC tag 1 can also be directly covered with the cover members 31 and 32.

7-3

In the foregoing embodiment, flat cover members 31 and 32 are prepared prior to integral forming, and the cover members 31 and 32 are deformed so as to conform to the IC tag 1 and the reinforcing members 21 and 22 by forming. However, as long as the air layers S are formed around the reinforcing members 21 and 22, the cover members 31 and 32 may have a shape that conforms to the IC tag 1 and the reinforcing members 21 and 22 prior to forming.

7-4

Figure 10:
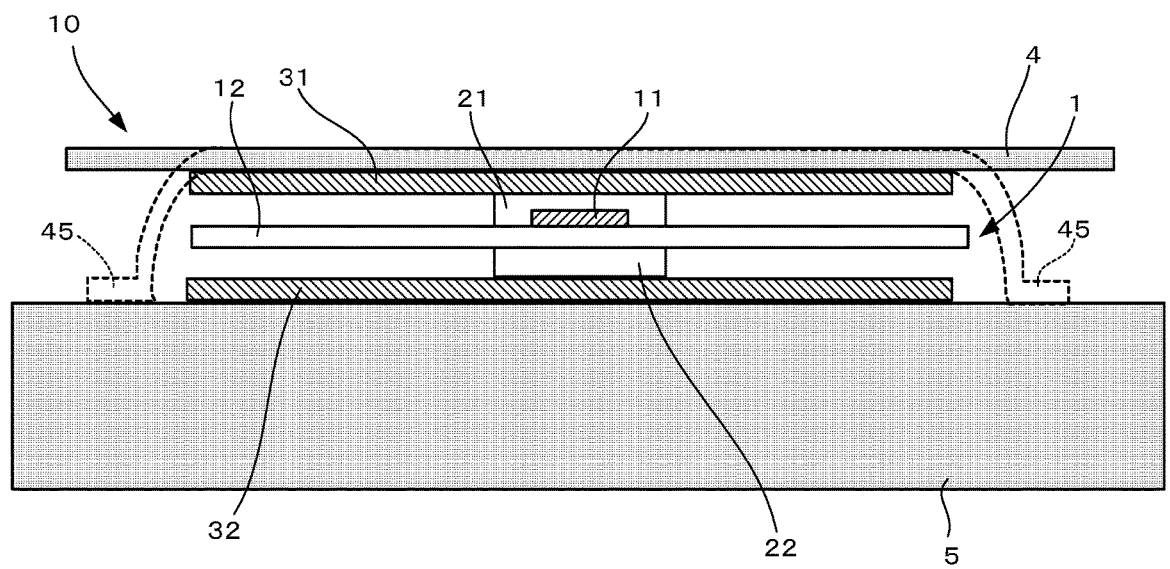
FIG. 10 is a cross-sectional view illustrating another mode in which an IC tag container is attached to a rubber product.

In the foregoing embodiment, the enclosing member 4 is formed into a bag-like shape; however, it can also be formed into a sheet-like shape. In this case, the enclosing member 4 covers only one side of the IC tag 1, a reinforcing member 2, and a cover member 3, whereby an IC tag container of the present invention is configured. When this IC tag container is to be attached to the rubber product 5, as shown in FIG. 10, the IC tag container 10, that is, the IC tag 1, the reinforcing member 2, and the cover member 3 are disposed on the rubber product 5, and the enclosing member 4 is disposed so as to cover the IC tag container 10. Then, peripheral edge portions 45 of the enclosing member 4 are fixed to the rubber product 5 (the state indicated by the dashed lines in FIG. 10) through the above-described integral forming processing. With this mode as well, the IC tag container and the IC tag-attached rubber product according to the present invention can be configured.

7-5

A variety of types of IC tags can be employed as the IC tag 1. In addition to an IC tag using a dipole antenna, such as that described above, an IC tag using a patch antenna may also be employed, and it is sufficient that the IC tag includes an IC chip to be protected by a reinforcing member. Moreover, the shape of the IC tag is not limited as well, and in addition to an elongated shape such as that described above, various shapes including a rectangular shape, a circular shape, a polygonal shape, and the like can be adopted in accordance with the use.

EXAMPLES

Hereinafter, examples of the present invention will be described. However, the present invention is not limited to the examples below.

1. Preparation of Examples and Comparative Example

IC tag-attached rubber products according to Examples 1 to 5 and a comparative example were prepared as described below.

Example 1

Example 1 is constituted by the following members.
IC tag: ALN-9640-FRA manufactured by ALIEN TECHNOLOGY.
First and second protective sheets: A pair of pieces of a PET tape (PF-075H manufactured by DIC Corporation) constituted by a PET base material with a thickness of 0.075 mm and a pressure-sensitive adhesive with a thickness of 0.035 mm, each having the same size as the base material of ALN-9640-FRA.
First and second reinforcing members: PET films (Bell-clear GAG manufactured by Mitsui Chemicals, Inc.) having dimensions of 7 mm by 6 mm and a thickness of 0.5 mm.
First and second cover members: Paper (manufactured by Sun A. Kaken Co., Ltd.) having the same size as the base material of the IC tag and having a thickness of 0.05 mm. Note that silicone coating is applied to a side of the paper that faces the IC tag.
Enclosing member (first and second enclosing materials): Composed of a pair of sheet-like enclosing materials (woven fabrics made of nylon 66 and impregnated with NBR, 2/2 twill) having a thickness of 1 mm.
Rubber product: A sheet made of NBR and having a thickness of 3 mm.

Figure 11:
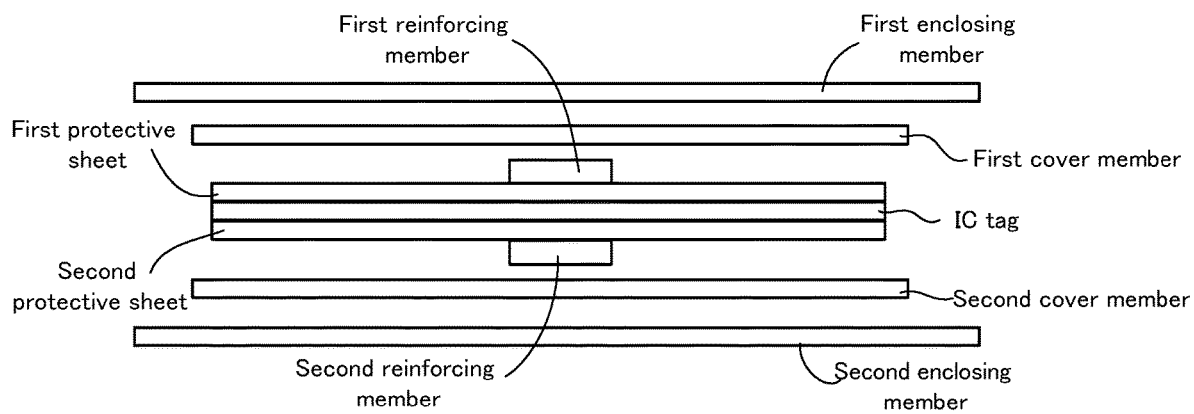
FIG. 11 is a cross-sectional view for explaining how Example 1 of the present invention was produced.

Example 1 was produced in the following manner using the above-described members. First, the IC tag was sandwiched between the pair of protective sheets via a pressure-sensitive adhesive, and furthermore, the reinforcing members were fixed onto the respective protective sheets with an adhesive. The reinforcing members were disposed so as to cover the IC chip of the IC tag. Thus, an IC tag provided with reinforcing members was produced. Next, as illustrated in FIG. 11, the first enclosing material, the first cover member, the IC tag provided with the reinforcing members, the second cover member, and the second enclosing material were stacked in this order. That is to say, each cover member was not adhesively joined to the IC tag. Then, peripheral edges of the first enclosing material and the second enclosing material were welded to each other using a high-frequency welder to obtain an IC tag container. Subsequently, the IC tag container and the rubber product were subjected to integral forming processing to produce an IC tag-attached rubber product such as that illustrated in FIG. 7. The processing was performed for 6 minutes under the heating and pressure-applying conditions of 200° C. and 0.3 MPa.

Example 2

Pieces of paper having a thickness of 0.075 mm were used as the protective sheets. Otherwise, the configuration of this example was the same as that of Example 1.

Example 3

PET films having a thickness of 0.1 mm were used as the protective sheets. Otherwise, the configuration of this example was the same as that of Example 1.

Example 4

PET films (PET100X1-V4 manufactured by Nippa Corporation) having a thickness of 0.1 mm were used as the cover members. Note that silicone coating was applied to a side of each PET film that faces the IC tag. Otherwise, this example was the same as Example 1.

Example 5

Pieces of a double-sided adhesive tape with a PET base material (Neo Fix 300 manufactured by Nichiei Kakoh Co., Ltd.) having a total thickness of 0.3 mm, with the PET of the base material having a thickness of 0.25 mm, were used as the reinforcing members, and PET films (Lumirror S10 manufactured by Toray Industries, Inc.) having a thickness of 0.1 mm were used as the cover members. Otherwise, this example was the same as Example 1.

Comparative Example

With respect to the configuration of Example 1, the pair of cover members were not used, and PET films having a thickness of 0.075 mm were used as the protective sheets. Otherwise, the configuration of this comparative example was the same as that of Example 1.

2. Evaluation Test

Five each of the IC tag-attached rubber products obtained in Examples 1 to 5 and the comparative example were prepared and subjected to repetitive flexing using a De Mattia flex tester (FT-1524 manufactured by Ueshima Seisakusho Co., Ltd.). After that, the readable ranges for 800 to 1000 Hz were measured using a Tagformance Lite (output power: 3.28 W EIRP), and it was confirmed that the readable ranges were not reduced. The conditions for the flex test were as follows. It should be noted that "rear projection" means that the rubber product side of an IC tag-attached rubber product is mountain-folded during flexing, whereas "front projection" means that the enclosing material side of the IC tagged rubber product is mountain-folded during flexing.

Test temperature: 23±2° C.
Reciprocating motion: 300 cycles/minute
Distance between clamps: 78 mm at the maximum (stretched to the maximum), 18 mm at the minimum (flexed to the maximum)
Stroke: 60 mm
Number of flexes: (1) rear projection: 1000 flexes→front projection: 1000 flexes, (2) rear projection: 2000 flexes→front projection: 2000 flexes, and (3) rear projection: 12000 flexes→front projection: 12000 flexes The results were as described below. Table 1 shows the number of tested IC tag-attached rubber products that did not exhibit a reduction in readable range, out of the five IC tag-attached rubber products that were tested.

TABLE 1

|  | Number of flexes (1) | Number of flexes (2) | Number of flexes (3) |
| --- | --- | --- | --- |
| Example 1 | 5 | 5 | 4 |
| Example 2 | 5 | 5 | 4 |
| Example 3 | 5 | 5 | 4 |
| Example 4 | 5 | 5 | 5 |
| Example 5 | 5 | 5 | 5 |
| Comparative Example | 0 | 0 | 0 |

As shown in Table 1, when the test regarding the readable range was conducted after the flex test, it was found that, with respect to those tests in which the number of flexes was 1000 and 2000, all of the five samples of each of Examples 1 to 5 exhibited substantially the same readable range as the readable range prior to the flex test. Meanwhile, all the samples of the comparative example exhibited a reduced readable range as compared with the readable range prior to the flex test. Accordingly, it was found that Examples 1 to 5 had excellent durability. On the other hand, with regard to the comparative example, it is considered that since no cover members were used, the enclosing materials directly pressed against the reinforcing members and the IC tag, and as a result, damage such as a break occurred in the IC tag.

Moreover, the number of flexes was further increased, and the test was conducted with the number of flexes being set at 12000. All of the samples of Examples 4 and 5, in which the cover members were formed of the resin films, did not exhibit a reduction in readable range. Meanwhile, one sample out of the five samples of each of Examples 1 to 3, in which the cover members were formed of paper, exhibited a reduction in readable range. However, with regard to the number of flexes, 12000 is such an extremely large number that is not usually expected in usage of a rubber product, for example. Therefore, it can be said that Examples 1 to 3, which did not exhibit a reduction in readable range in the flex test in which the number of flexes was 2000, also had sufficient durability. Then, it was found that Examples 4 and 5, which did not show a reduction in performance even in the flex test in which the number of flexes was 12000, had extremely high durability.

REFERENCE SIGNS LIST

1 IC tag
10 IC tag container
11 IC chip
12 Antenna
21, 22 Reinforcing member
31, 32 Cover member
4 Rubber product (attachment target member)

The invention claimed is:

1. An IC tag container to be attached to an attachment target member, the IC tag container comprising:
   an IC tag that includes an IC chip and an antenna configured to electrically transmit and receive information stored in the IC chip;
   at least one reinforcing member that is disposed on at least one surface of the IC tag and that covers the IC chip;
   at least one sheet-like cover member that is disposed on the at least one surface side of the IC tag and that covers at least the antenna and the reinforcing member; and
   an enclosing member that is disposed on the at least one surface side of the IC tag, that covers the IC tag, the reinforcing member, and the cover member, and that is attachable to the attachment target member,
   wherein the cover member is configured to be slidable along at least a portion of the IC tag, and
   the cover member is not adhesively joined to the IC tag around the reinforcing member.

2. The IC tag container according to claim 1, further comprising:
   two of the reinforcing members and two of the cover members,
   wherein both surfaces of the IC chip are covered with the respective reinforcing members, and
   the reinforcing members are covered with the respective cover members.

3. The IC tag container according to claim 1,
   wherein the cover member is formed of a resin material.

4. The IC tag container according to claim 1,
   wherein the enclosing member is formed into a bag-like shape that contains the IC tag, the reinforcing member, and the cover member.

5. The IC tag container according to claim 1,
   wherein the enclosing member is formed of a fabric impregnated with rubber.

6. The IC tag container according to claim 5,
   wherein the rubber is unvulcanized.

7. An IC tag-attached rubber product comprising:
   the IC tag container according to claim 5; and
   an attachment target member that is at least partially foiled of a rubber material and that is adhesively joined to the enclosing member of the IC tag container.

8. The IC tag-attached rubber product according to claim 7,
   wherein the enclosing member of the IC tag container is formed into a sheet-like shape,
   the IC tag, the reinforcing member, and the cover member are disposed between the enclosing member and the attachment target member, and
   a peripheral edge of the enclosing member is adhesively joined to the rubber material of the attachment target member.

* * * * *